Patented June 20, 1944

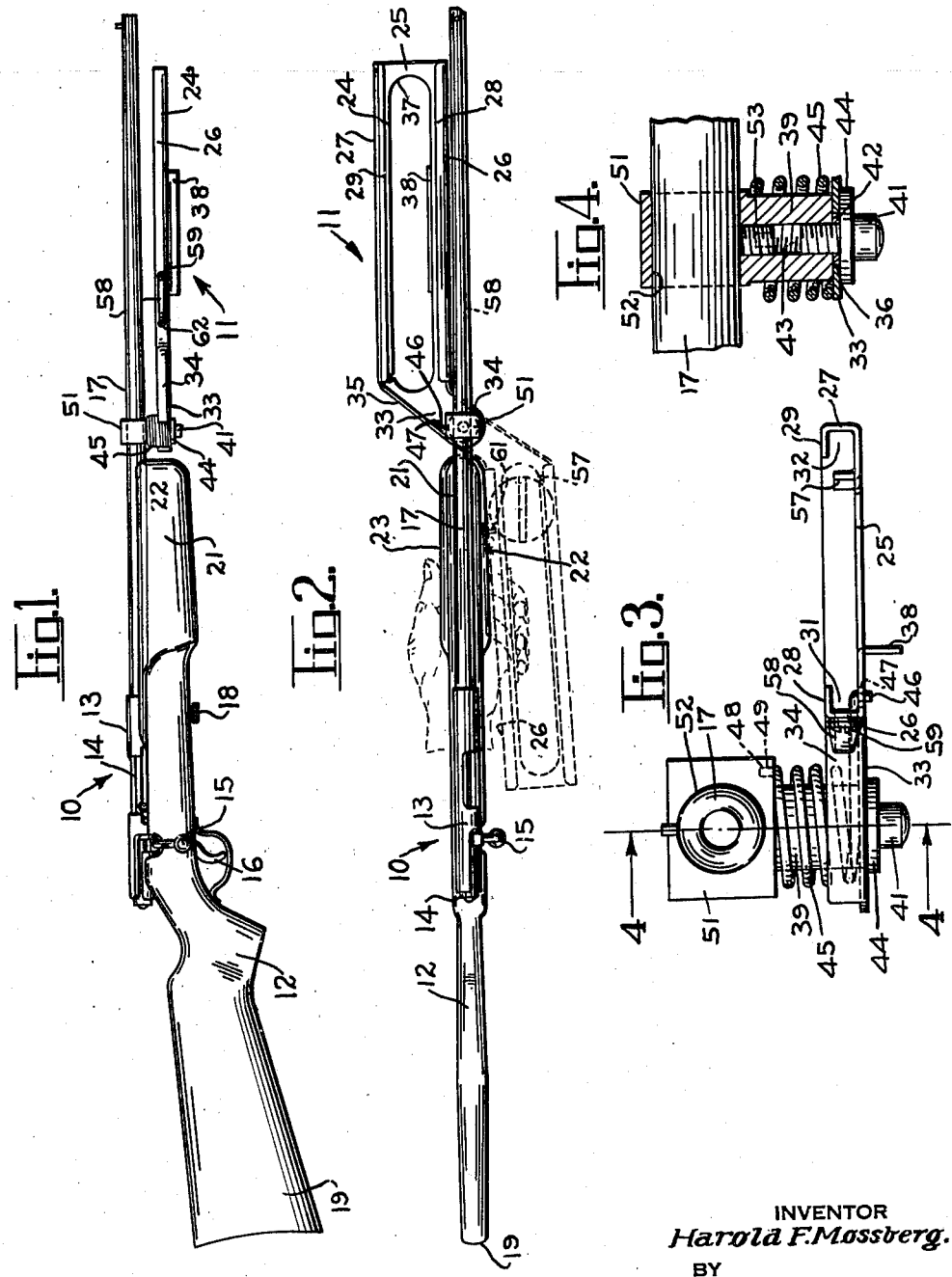

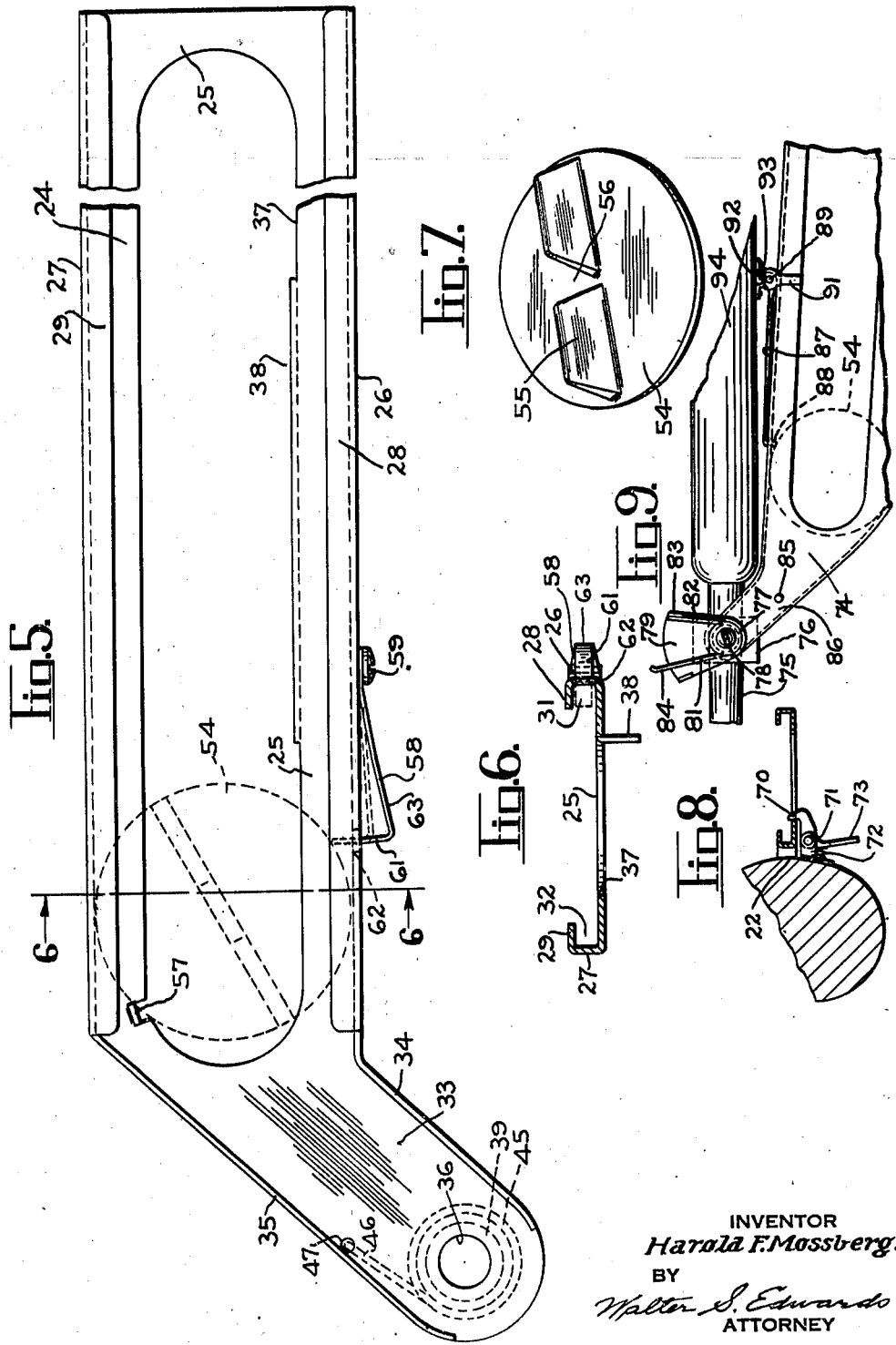

2,351,869

UNITED STATES PATENT OFFICE 2,351,869

TRAP GUN

Harold F. Mossberg, New Haven, Conn., assignor to O. F. Mossberg & Sons, Inc., New Haven, Conn., a corporation of Connecticut Application December 29, 1939, Serial No. 311,531

14 Claims. (Cl. 42—1)

This invention relates to trap guns and more particularly to an improved form of trap gun wherein the ammunition firing gun portion thereof has a target throwing trap combined therewith and adapted to throw targets away from, for instance forwardly of, the gun portion.

Subsequent to this invention it was necessary to obtain and carry along to the practice field, a target throwing trap separate from the gun. It was not only inconvenient to carry along such additional equipment, but an added expense was involved, as such traps were often relatively complicated in structure and therefore expensive. To overcome these and other disadvantages it is contemplated, as one object of this invention, to provide an improved trap gun having a combined gun portion and a trap portion for use in target practice and the like.

Another object is to provide in a trap gun of this nature an improved form of target throwing device.

Still another object is to provide a trap gun of this nature with a trap portion adapted to releasably hold a target when in one position in respect to the gun portion, due to the engagement of a part of the trap portion with the gun portion and to throw this target away from, for instance forwardly of, the gun portion when the trap portion is released from such engagement therewith.

A further object is to provide in a trap gun, a novel combination of a shot gun portion and a trap portion which are associated, and which cooperate, in such a manner that the trap so formed will be convenient to carry and to manipulate when used for target practice.

A still further object of this invention is to provide an improved trap gun which will be relatively inexpensive to manufacture, simple in construction, compact, of pleasing appearance, and which is very efficient and durable in use.

With these and other objects in view, which will appear as the description proceeds, there have been illustrated in the accompanying drawings several forms in which the invention may be conveniently embodied in practice.

In the drawings, wherein like reference numerals designate like parts throughout the several views:

Figure 1 is a side elevational view of a trap gun embodying the features and principles of this invention;

Figure 2 is a top plan view of the same, showing one position of the trap portion thereof in dotted lines;

Figure 3 is an enlarged end view of the same;

Figure 4 is a cross-sectional view taken on the line 4—4 of Figure 3;

Figure 5 is an enlarged top plan view of the trap portion of this invention removed from the gun portion thereof;

Figure 6 is a cross-sectional view taken on the line 6—6 of Figure 5;

Figure 7 is a perspective view of a target adapted for use with the trap gun of this invention;

Figure 8 is a broken sectional view of a trap gun provided with a releasable catch adapted to hold the trap portion thereof in target throwing position; and Figure 9 is a broken underneath view of a trap gun of somewhat modified form.

The trap gun of this invention, and which is illustrated in the drawings (see Figures 1 and 2) generally comprises an ammunition firing gun portion, or firearm, 10 and a trap, or target throwing, portion 11. The ammunition firing gun portion 10, in this instance, includes the usual stock 12, a receiver 13, a slidable bolt 14, a bolt operating handle 15, a trigger 16, and a barrel 17. A take-down screw 18 secures the receiver 13 to the stock 12 and the gun portion in general is adapted to be operated to fire small calibre shot shells in the usual manner. The stock 12 is extended forwardly from its shoulder piece 19 to form a forearm 21 adapted to support the rear end of the barrel 17 and to have its sides 22 and 23 extend upwardly around the barrel 17 at either side thereof in a manner to be conveniently grasped by a hand of the user (see dotted lines in Figure 2).

The trap portion 11 of the trap gun of this invention, in this instance, includes a lengthwise elongated relatively narrow frame 24 having a flat bottom plate 25, upstanding opposing sides 26 and 27, the upper edges 28 and 29 of which are bent toward each other over the bottom plate 25, whereby opposing channels 31 and 32 are formed along each lengthwise edge of the bottom plate 25. A tongue 33 extends angularly from one end of the bottom plate 25 to beyond one side thereof, herein shown as side 26, and has its side edges upturned to form strengthening flanges 34 and 35. The tongue 33 is relatively narrow and has a hole 36 provided in its outer end. The bottom plate 25 has an elongated opening 37 formed therein to lighten the same in weight. A finger engaging bar 38 is formed integral with, or is suitably secured to, the frame 24, and in this instance, depends from the bottom plate 25 adjacent the frame side 26.

The frame 24 is detachably and pivotally mounted to the gun portion, in the instance illustrated, by having the tongue 33 rotatively secured to a cylindrical post 39 by a screw 41. The screw 41 passes through a washer 42, which fits into the hole 36 in the outer end of the tongue 33, and then screw-threads into a threaded opening 43 provided in the post 39. Another washer 44, or collar integral with the screw 41, is provided to hold the tongue 33 in position upon the washer 42 and the post 39. A coiled spring 45 having one of its ends 46 engaging the frame 11 in a hole 47 provided in the tongue 33, encircles the post 39 and has its other end 48 engaged with the post 39 in a hole 49. The post 39 is formed at its upper end to provide a rectangular base 51, which has a hole 52 formed therein adapted to have the barrel 17 of the gun portion 10 inserted therethrough. The post 39 is detachably secured in proper operative position to, and on, the gun portion 10 by a set screw 53 screw-threaded in the opening 43 and tightly clamped against a part of the gun portion, herein shown as the barrel 17 disposed in and through the hole 52 in the base 51. The spring 45 is tensioned to normally maintain the frame 24 substantially parallel to and beneath the forward end of the barrel 17.

A readily fracturable target comprising a disc-like base 54 having a diametrically aligned upstanding rib 55 preferably interrupted at its center by being cut away as at 56, may be used with the trap portion 11 to be thrown thereby away from, for instance forwardly of, the gun portion 10 by the action of the spring 45. The target base 54 is of proper diameter to easily slide upon the bottom plate 25 of the frame 24 with its peripheral edges in the opposing channels 31 and 32. An upstanding stop 57 is provided on the frame bottom plate 25 which may be struck up from the material thereof, as shown, and is in a position to be engaged by the target base 54 to position it at the rear end of the frame 24. An outwardly bowed leaf spring 58, secured at one end to the upturned frame side 26 by a rivet or screw 59, has its other end 61 inturned to pass through an opening 62 formed in the frame side 26 to engage the target base 54 forwardly of its center, to hold it in its rear position in the frame 24, when the leaf spring 58 is sprung inwardly by pressure upon its outer surface 63. In the above manner the leaf spring 58 forms a releasable catch for the target to hold it in throwing position in the frame 24 as shown in dotted lines in Figure 2.

The frame 24, when swung into the target throwing position, as shown in dotted lines in Figure 2, may be held in such position against the tension of the coiled spring 45, by the fingers of the user's hand, grasping the forearm portion 21 of the stock 12 and overlying the bar 38. When the frame 24 is held in this position, the outer surface 63 of the spring catch 58 is engaged against the side 22 of the forearm portion 21 of the stock 12 and the inturned end 61 of this spring catch is pressed inwardly of the frame 24 to lie in the path of the target base 54 to prevent it falling therefrom and to maintain it in throwing position therein. Release of the bar 38 by the fingers permits a rapid rotary movement of the frame 24 by the coiled spring 45 about its pivotal connection with the gun portion 10 and releases the target from the spring catch end 61 whereupon the target is thrown from the frame 24, by traversing the frame 24 upon its bottom 25 and between its sides 26 and 27, forwardly of the gun for use as a flying target.

While it may be preferable to use the fingers of the user as a releasable catch for holding the frame 24 in target throwing position it may be desirable to provide a catch device similar to that shown in Figure 8. In this instance, the catch device includes a catch member 70 pivoted to a base bracket 71 which is secured to a gun part, such as the forearm side 22, and biased by a spring 72 to overlie and to engage the edge of the bottom plate 25 in the opening 37 therein. A finger piece 73 formed on the catch 70 is positioned to be engaged by a finger of the user's hand grasping the forearm portion 21 to release the catch 70 from the frame 24 to release it for target throwing action.

In the form of trap gun shown in Figure 9, the trap portion includes a frame 74 formed substantially the same as the previously described frame 24 and being pivotally secured to the barrel 75 of the gun portion in the same manner that is by means of a post 76, collar 77, and screw 78. In this instance, however, means to cushion the shock occasioned by the abrupt stopping of the rapid forward swinging of the frame 74 is provided. This means comprises a quadrant shaped member 79 clamped between the collar 77 and the post 76 to be nonrotatable relatively thereto. A resilient member, or spring 81 wrapped about the collar 77 has one of its arms, 82, in engagement with a short flange 83 struck up from the member 79. The other arm 84 of the spring 81 is extended beyond the outer edge of the member 79 to be disposed in the path of a pin 85 provided in the tongue portion 86 of the frame 74. Engagement of the pin 85 with the end of the spring arm 84 will act as a resilient stop for the frame 74.

In place of the catch device illustrated in Figure 8, the form shown in Figure 9 includes a target holding long lever arm 87, the bent in end 88 of which is adapted to be engaged by the edge of the target disc 54 as in the previously described form. The long lever arm 87 is pivoted by a rivet 89 to a lug 91, secured, as by brazing, to the frame 74. A short lever arm 92 bent downwardly at right angles to the plane of the frame 74 and adapted to hook into a loop 93 secured to the side of the gun portion forearm 94. The arm 92 is off center to the side of the rivet 89 opposite that from which the long lever arm 87 extends so that when it is engaged in the loop 93 it will urge the long lever arm 87 toward the frame 74 and dispose the end 88 in the path of the target disc 54 to hold it in the frame 74. Disengagement of the arm 92 from the loop 93 by springing the frame 74 upwardly by means of the fingers of the user's hand grasping the forearm 94 will release the target retaining end 88 and permit a target to be thrown from the frame 74 as in the previously described form.

The operation of the trap gun of this invention consists in loading the gun portion 10 in the usual manner with a suitable shot shell of small calibre. A target disc 54 is then slid onto and along the frame bottom plate 24 between its sides 26 and 27 within the channels 31 and 32 until it engages the stop 57. The frame 24 is then swung on its pivotal connection with the gun portion 10 into the dotted line position shown in Figure 2, to wind up the coiled spring 45 and increase its tension. The bar 38 is then grasped by those fingers of the user's hand grasping the forearm portion 21, and the frame 24 is pressed tightly against the forearm portion side 22 which presses in the spring catch end 61 and holds the target disc 54 in place. Should a catch 70 be used, the frame is swung about its pivot until the catch 70 engages the same as above described. The trap gun is now ready for use and is pointed out over the field. The frame 24 is then released and rapidly swings outwardly and forwardly due to the spring 45, whereupon the target disc 54 is thrown rapidly forwardly of the gun portion 10 to present a flying target to the user, who thereupon sights the gun portion and fires it in an attempt to hit the same.

A trap gun provided with the combination of an ammunition firing gun portion and a trap portion associated and in cooperation as above described is particularly convenient to carry to a desirable location for target practice especially as there are no separate parts to be carried. Due to the particular manner these trap gun portions are associated, for instance, in that the trap portion 11 lies beneath, parallel to, and closely adjacent the barrel 17, a complete trap gun constructed as above described may not only be readily packed for shipping, but may be as readily slipped into a gun case for convenient carrying.

While there have been shown and described herein several forms of an improved trap gun, it is to be understood that the invention may be embodied in other forms without departing from the spirit and essential attributes thereof. It is therefore desired that the present embodiments be considered in all respects as illustrative and not restrictive, and it will be further understood that each and every novel feature and combination thereof, present in, or possessed by, the device herein disclosed, forms a part of the invention included in this application.

What is claimed as new and for which it is desired to secure Letters Patent is:

1. In combination with a firearm wherein a barrel adapted to have projectiles fired therethrough is provided, of a trap adapted to support and throw disc-like targets, means to removably and pivotally mount said trap to the barrel of said firearm, said trap being swingable rearwardly in respect to said barrel into target throwing position and constructed and arranged to be engaged and held by a hand of the user holding the firearm, and spring means tensioned by the aforesaid rearward movement of said trap to actuate it to throw a target therefrom when said trap is released from the control of the said hand of the user.

2. A trap gun comprising a gun portion and a trap portion, means to mount said trap portion to said gun portion, said trap portion being movable in respect to said gun portion into a target throwing position, and spring means tensioned by the aforesaid movement of said trap portion to actuate said trap portion to throw a target, and means on said trap portion positioned to be engaged by a part of said gun portion when said trap portion is in target throwing position to releasably hold a target in said trap portion.

3. In a trap gun, a gun portion, a trap portion mounted on said gun portion for movement into target throwing position and to throw a target supported thereby forwardly of said gun portion, means to actuate said trap portion to so throw a target, and common means to retain a target in said trap portion and said trap portion in target throwing position.

4. In combination, a firearm comprising a barrel, shot shell firing mechanism, and a trigger positioned to be engaged by a finger of one hand of the user for actuating said mechanism, a frame adapted to support a frangible disc-like target, means to removably and pivotally mount said frame to the firearm intermediate the forward end of the barrel and the trigger thereof, spring means to constantly urge said frame about the pivoting means in one direction, means to releasably hold said frame swung about said pivoting means in the other direction, and means to release said frame holding means and positioned to be actuated by a finger of the other hand of the user.

5. In a trap gun, a gun portion, a trap portion including a frame adapted to support a target, means to pivotally secure said frame to said gun portion, spring means constantly urging said frame about said pivoting means in one direction, means to releasably hold a target on said frame when it is swung about said pivoting means in the other direction, and means adapted to be releasably engaged to hold said frame swung about said pivoting means in the other direction, said frame holding means and said target holding means comprising a single member pivoted to said frame.

6. The combination of, a firearm wherein a barrel is provided through which bullets are projected, and a substantially flat frame having opposed side flanges and a bottom between and on which, respectively, a disc-like target is guided and supported, means to pivot said frame to said firearm for swinging movement forwardly in respect to said barrel to throw the said target supported thereon away from said firearm, spring means acting on said frame and tensioned to constantly bias the same in the aforesaid forward position, and releasable means to catch and hold said frame with a target thereon in a rearward position in respect to said firearm barrel against the action of said spring.

7. A target throwing mechanism including a frame member having opposed side flanges and a bottom by which a disc-like frangible target is guided and supported respectively, a pivot upon which an end of said frame is swingably mounted, a spring to bias said frame into a target throwing position, releasable means to catch and hold said frame in position against the biasing action of said spring, and common means to support said frame pivot and to form a clamp member to detachably secure said mechanism to the underside of the barrel of a shot shell firing gun.

8. A trap gun comprising in combination, a shot shell firing gun portion, and a disc-like target throwing trap portion attached to said gun portion for swinging movement relatively thereto, means to actuate said gun portion to fire a shot shell and positioned to be operated by a finger of one hand of the user, releasable means to actuate said trap portion, and means to release said trap portion actuating means and positioned to be operated by a finger of the other hand of the user while the trap gun is held in normal operative position by both hands of the user.

9. A trap gun comprising in combination, a projectile firing gun portion including a barrel, and a swingable disc-like target throwing trap portion, a pivot by which said trap portion is secured to said gun portion to swing substantially parallel with and closely adjacent to said barrel, trigger means to actuate said gun portion and positioned to be operated only by a finger of one hand of the user, releasable means secured by said pivot to said gun portion and adapted to actuate said trap portion, and means to release said trap portion actuating means and positioned to be operated only by a finger of the other hand of the user while the trap gun is being held in normal firing position by both hands of the user.

10. In a trap gun, the combination of a projectile firing gun portion having a barrel, and a target throwing trap portion, said trap portion comprising a frame adapted to releasably support a disc-like target, a pivot upon which one end of said frame is swingably mounted, and a spring to act on said frame to actuate it to throw a target therefrom, and common means to detachably secure said pivot, said spring, and said frame to the barrel of said gun portion in position to swing closely adjacent and substantially parallel thereto.

11. In combination, a firearm comprising a barrel and a trigger for actuating said firearm positioned to be engaged by a hand of the user holding said firearm, and a frame having opposed side flanges and a bottom between and on which, respectively, a disk-like target is guided and supported, means to pivot one end of said frame to said firearm intermediate the forward end of said barrel and said trigger for swinging movement forwardly in respect to said barrel to throw a supported target therefrom and away from the firearm, a spring acting on said frame to bias said frame into its forward position, and releasable means, positioned to be engaged by a finger of the hand of the user other than the hand holding the firearm, to catch and hold said frame with a target thereon in a rearward position in respect to said firearm barrel.

12. In combination, a firearm comprising shot shell firing mechanism, a trigger for firing said mechanism, a butt stock a forearm positioned to be engaged by one hand of the user to hold an end of the butt stock against the user's shoulder, said trigger being positioned to be engaged by a finger of the other hand of the user, and a barrel through which the bullets are projected from a shot shell, and a frame having opposed side flanges and a bottom between and on which, respectively, a disc-like target is guided and supported, means to pivot one end of said frame to said firearm intermediate the forward end of said barrel and said trigger for swinging movement forwardly in respect to said barrel to throw a supported target therefrom and away from the firearm, a spring acting on said frame to bias said frame into its forward position, and releasable means, positioned to be engaged by a finger of the hand of the user grasping the forearm to be released thereby, to catch and hold said frame with a target thereon in a rearward position in respect to said firearm barrel and against the biasing action of said spring.

13. In combination, a firearm comprising a stock adapted to be grasped by a hand of the user, shot shell firing mechanism, a trigger arranged to be engaged by a finger of the hand grasping the stock to actuate said mechanism, a forearm extending forwardly of said trigger in position to be grasped by the other hand of the user to support said firearm, and a barrel through which bullets are projected from a fired shot shell, a frame having means to support and guide a disc-like target and being pivotally and removably secured to said barrel intermediate the ends of the barrel, a spring to bias said frame in a forwardly swung position in respect to the firearm barrel, and a releasable catch mounted on said firearm in position to engage said frame to hold it in a rearward position against the biasing urge of said spring and being positioned to be engaged and released by a finger of the hand grasping said forearm.

14. In combination, a firearm comprising a shoulder engaging stock and a trigger disposed in position to be engaged by a finger of the hand of the user supporting said stock to actuate the usual mechanism to fire a shot shell, a barrel extending forwardly from said stock and through which bullets are projected from a fired shot shell, and a target throwing mechanism comprising a target holding frame adapted to support and guide disc-like targets, pivoted at one of its ends to and beneath said barrel, spring means to swing said frame about its pivot to a position with its free end forward of its pivot to throw a target therefrom and away from said firearm, releasable means to retain said frame with a target thereon against the action of said swinging means in a position with its free end to the rear of its pivot, said releasable means positioned to be actuated by a finger of the other hand of the user to release said frame therefrom.

HAROLD F. MOSSBERG.